DE WITT C. COOKINGHAM.
COMBINED CONTROLLER AND CIRCUIT CLOSER.
APPLICATION FILED SEPT. 11, 1907.

911,030.

Patented Feb. 2, 1909.

3 SHEETS—SHEET 1.

DE WITT C. COOKINGHAM.
COMBINED CONTROLLER AND CIRCUIT CLOSER.
APPLICATION FILED SEPT. 11, 1907.
911,030.
Patented Feb. 2, 1909.
3 SHEETS—SHEET 2.
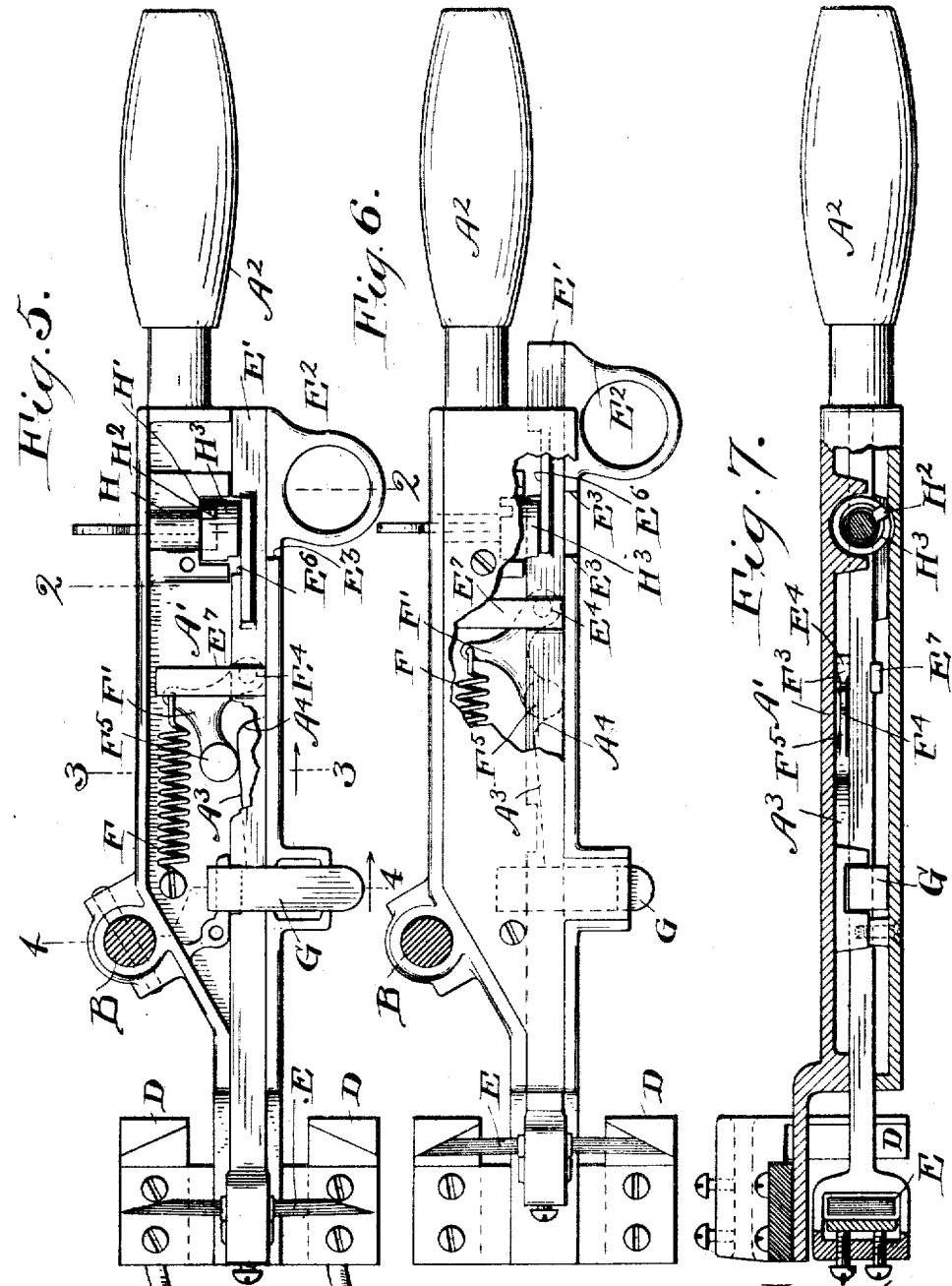
Witnesses
E. B. Gilchrist
H. R. Sullivan
Inventor
DeWitt C. Cookingham
by
Thurston & Woodward
Attys.

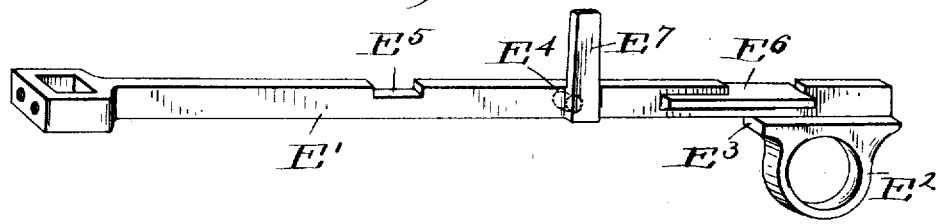
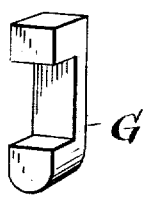
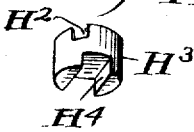

UNITED STATES PATENT OFFICE.

DE WITT C. COOKINGHAM, OF CLEVELAND, OHIO, ASSIGNOR TO THE RAUCH AND LANG CARRIAGE COMPANY, OF CLEVELAND, OHIO, A CORPORATION OF OHIO.

COMBINED CONTROLLER AND CIRCUIT-CLOSER.

No. 911,030.　　　Specification of Letters Patent.　　　Patented Feb. 2, 1909.

Application filed September 11, 1907. Serial No. 392,284.

*To all whom it may concern:*

Be it known that I, DE WITT C. COOKINGHAM, a citizen of the United States, residing at Cleveland, in the county of Cuyahoga and State of Ohio, have invented a certain new and useful Improvement in a Combined Controller and Circuit-Closer, of which the following is a full, clear, and exact description.

The object of the present invention is to provide an improved arrangement for the control of electrically operated machines, particularly electric automobiles.

An object of the invention is to provide means whereby the machine may be left with safety by the operator without danger of an unauthorized person using or operating the same during his absence.

It is further my purpose to provide means whereby the operator may throw open the circuit closer instantly in an emergency, without either reference to the position of the controller handle or the necessity of using two hands or making any material movement of the operating hand.

It is also my purpose, in addition to the above named objects, to provide an arrangement whereby when the circuit is once open it will thereafter be impossible to close the same until the controller is thrown to its off position regardless of what position the controller may have been in when the circuit was thrown open.

The above named objects, it will be seen, are obtained by the mechanism which I describe below, reference being had to the accompanying drawings in which—

Figure 1:
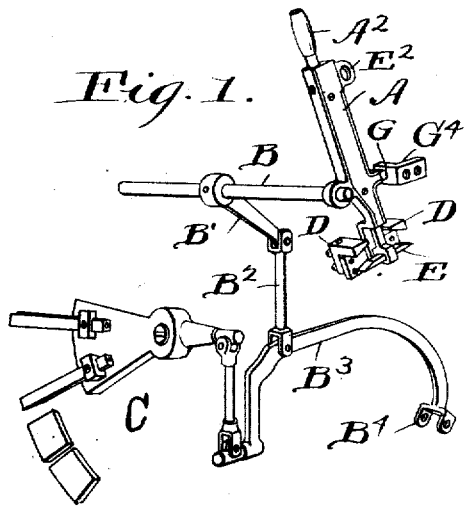
Figure 2:
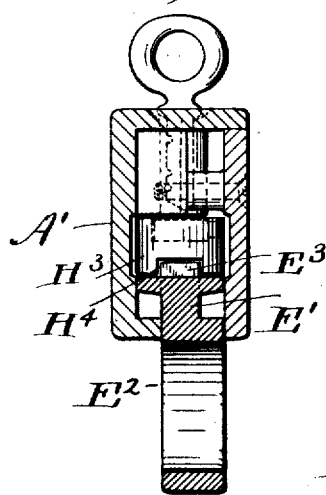
Figure 4:
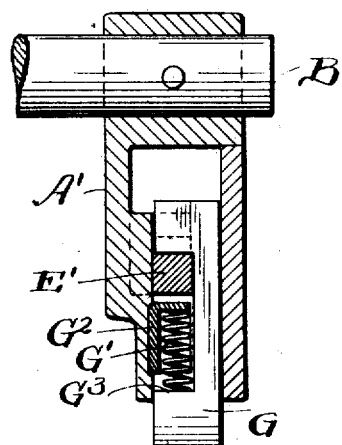
Figure 3:
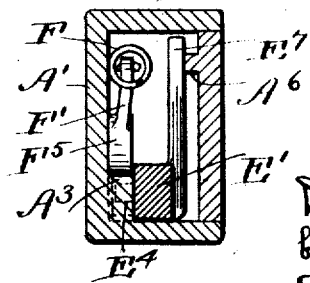

Figure 1 is a perspective view illustrating the general arrangement of parts in my combined controller and circuit closer. Fig. 2 is a section on the line 2—2, Fig. 3 is a section on the line 3—3, and Fig. 4 is a section on the line 4—4 of Fig. 5. Fig. 5 is a side view of the controller handle with the side plate removed and the stem of the circuit closer partly broken away to show the construction of the detail parts, the circuit being open. Fig. 6 is a side view of the controller handle with a side plate thereon, but broken away showing the position of certain parts when the circuit is closed. Fig. 7 is a longitudinal cross section of the controller handle. Fig. 8 is a perspective view of the stem of the circuit closer. Fig. 9 is a perspective view of the catch which holds the stem of the circuit closer against retraction after it has once been opened. Fig. 10 is a perspective view of the box which holds the spring for operating the catch for the circuit closer stem. Figs. 11, 12 and 13 are respectively sectional, side and end views of the detent for holding the circuit closer in its closed position. Figs. 14 and 15 are perspective views, looking from opposite ends, of the locking barrel which is interposed between the key lock and the circuit closer stem.

In the drawings it will be seen that the controller handle A is mounted on and keyed to a rock shaft B, through the medium of which the controller C is operated, as shown in Fig. 1, the connections between the controller and the said rock shaft being obtained by means of a crank B' and link connection B² so that when the controller arm is thrown in one direction, as for example forward as in Fig. 1, the controller will be on, whereas when the handle is thrown in the other direction, that is to say backward in Fig. 1, the controller will be in the off position. In Fig. 1 it will be seen, of course, that the pivoted arm B³ to which the link B² is connected is constructed so as to be pivoted at one end B⁴ to the frame of the machine.

The controller handle is made in the form of a casing A' and has at one end thereof, and rigidly connected thereto, the terminals D for the circuit for the machine, which circuit may be closed by means of a brush E bearing against the terminals and operated through the medium of a stem E' lying the casing of the controller handle. This stem has at its upper end a hand-piece E² projecting through a slot in the upper end of the handle casing in such proximity to the grip A² of the handle that the lower part of the hand of the operator may be thrust against said hand-piece without making any material movement of the hand away from the grip, for the purpose of thrusting the said stem downward and opening the circuit when it is desired. This hand-piece is also properly shaped so that the stem may be drawn up by a finger and the circuit closed.

In order that the position of the stem of the circuit closer may be properly controlled, I provide in the handle casing a tension spring F suitably secured at one end to the casing and secured at the other end to a sliding detent F'. This detent, as shown in Figs 11, 12 and 13, is of a Y shape and has a socket F² in one leg F³ receiving a projection E⁴ from the side of the said stem. As the tension spring is secured to the middle leg F⁴ of the Y, there is obviously a tension pulling the stem E' downward, and when this downward movement is checked by means of a shoulder E³ on the stem bearing against the frame, there will obviously be a tendency to rock the Y detent inward and thrust the end of the third leg F⁵ in the direction which would be designated as downward in Figs. 5 and 6. For the purpose of affording a bearing for the end of this third leg F⁵, of the Y shaped detent, I provide an inclined shoulder A³ along the side of the frame, this shoulder having a rounded end A⁴ over which the end of the detent leg F⁵ drops and binds when the stem of the circuit closer is drawn up into the closing position. The tension of the spring holds the free end of the detent down behind this rounded shoulder, but the curves or angles of the shoulder and the bearing surface of the detent are such that a quick thrust of the hand downward onto the hand-piece E² of the stem will cause the detent to ride up on the shoulder and release the stem so that the tension of the spring F shall draw it downward and open the circuit by reason of the brush E being carried away from the circuit terminals D.

By reason of the hand-piece E² on the stem being, as above stated, in immediate proximity to the grip A² of the controller handle, the operator can in an emergency thrust his hand quickly downward against the said hand-piece and open the circuit without pulling the controller handle back, and is thus independent of any chance sticking of the controller or of any obstruction such as bundles or other impediments, dropping behind the controller handle. It is to be particularly noted that with this detent arrangement the circuit closing stem is held up securely in all positions of the controller handle, and yet is capable of instant release, likewise in all positions.

In order that a thoughtless or careless operator may not close the circuit while the controller is in its "on" position, I provide an automatic catch, for the stem, consisting of a spring pressed slide G, as is shown in Figs. 4 and 9, which is normally thrust outward and has on its inner end a projection adapted to fit into a notch E⁵ in the side of the stem when the latter is thrown downward so that the circuit is open. For the purpose of the better assembling of parts, I provide as a shoulder for receiving the inner thrust of the compression spring G' which throws the catch outward, a small box G² fitting into a proper socket in the frame, the compression spring being interposed between the inner end of this box, and a shoulder G³ at the outer end of the catch. This catch, being automatically thrown into the notch E⁵ on the stem when the latter is in its down or open position, it will plainly be impossible to draw the said stem back so that the circuit will be closed, as will be seen by reference to Figs. 5 and 6, unless the catch be pushed and held inward away from said notch E⁵ in the stem at the same time that the stem is drawn upward. It will, therefore, be impossible for any operator to carelessly or absent-mindedly draw the stem upward. He may, however, retract or lift the stem by throwing the controller handle back to the "off" position, at which point I provide a stop G on the frame of the machine, see Fig. 1, in such position as to thrust the catch in and release the stem so that it may be pulled upward. By this means I insure that thoughtless and heedless persons shall be relieved of the danger of closing the circuit while the controller is on, and thus avoid the numerous accidents which occur with electric automobiles, by reason of this carelessness.

In order that the machine may be protected against use by an unauthorized person during the absence of the operator, I provide means for locking the circuit closer in its open position, with a Yale or other equivalent lock, the key for which the operator may carry with him.

In the upper part of the frame a small lock case H is provided having projecting from the inner end of the turning member a lug H' which fits into a notch H² on one side of a revolving barrel H³. On the other side of the revolving barrel is a slot H⁴ of suitable width to permit the passage of the stem E' of the circuit closer therethrough, as shown in Figs. 14 and 15. The parts are arranged so that when the key is inserted and is turned to the unlocking position, the slot H⁴ in said revolving barrel will be in alinement with the edge of the stem E' and permit the same to be drawn up therethrough, see Figs. 5 and 6. When the stem is in its downward, or open position, however, that portion of the stem which is adjacent to the barrel H³ is sufficiently cut away as at E⁶ to permit the latter to be turned by means of the lock so that its notch H⁴ will be out of alinement with the edge of the stem and the latter may not be again pulled up into closed position until the key be again turned to unlocking position. It will thus be seen that the operator can, when he has once opened the circuit in any position of the controller, turn the key to locking position and remove it, leaving the machine in such condition that it cannot be operated by any person except one having a key for this particular lock. For the purpose of holding the stem somewhat steady in its sliding position, it will be noticed that I have provided a projecting lug $E^7$ thereon which rides against a short rib $A^6$ cast on the inner side of the side plate as shown in Fig. 3.

From the above description it will be seen, that many advantages are obtained over the prior art. For example, in those machines where the circuit closer is absolutely independent of the controller, as in places where a plain plug is used, it is well known that anyone can use the machine at any time by inserting nails, screws and similar imperfect plugs into the socket, which is always open. Further, the operator is at any time liable to insert the circuit closing plug, at a time when the controller is in its "on" position, thus causing the machine to dart suddenly forward with an accident possibly resulting. Again in an emergency it is only by the quickest movement and entire release of the controller handle, that the operator may remove the plug and open the circuit, should the controller for any reason stick. Furthermore these plugs themselves, as circuit closers, are not thoroughly efficient since each imperfection which they may have in the beginning is increased by the formation of small arcs, fusing the metal and forming globules thereof.

In those cases where it has been desired to guard against the use of the machine by unauthorized persons, by the provision of an automatic Yale lock to a door or shutter protecting the ordinary plug, it has been found that in an emergency it is an absolute impossibility for anyone to open the lock and get the plug out within a reasonable amount of time, and this in any case requires the use of both hands. With said former arrangement there is no guard against the insertion of the plug by an absent-minded operator, himself, when the controller is in its "on" position. There are also certain structures in which the circuit closer is operated directly by the key, the turning of which closes the circuit, but with said arrangement there is nothing to provide against the absent-minded or careless closing of the circuit when the controller handle is on one of the running notches. Again, if the controller handle should stick, it obviously would require quite an amount of time and skill to manipulate the key to open the circuit.

In those prior devices in which a mere indicator is used, such as a falling or sliding gate covering the plug socket in order to warn the careless operator that the controller handle is forward, before he shall insert the plug, no provision is had for preventing strangers from using the machine, and the operator is in an as embarrassed situation when an emergency occurs as in the case of any of the other prior devices.

All of the above indicated disadvantages of the prior structures are overcome in my arrangement, as I have pointed out, since no person can close the circuit except a person possessing a key fitting the particular lock, and this is true regardless of the position of the controller handle when the circuit was last opened or at the time of attempted use.

The operator may in case of fright or actual danger instantly open the circuit with the hand by which the controller is operated without moving the same other than to give it a quick downward thrust, and this independently of whether the controller sticks, or is on or off. Further the operator, no matter how careless or how absent-minded, cannot draw the circuit closer up until the controller handle is drawn back to the position where the controller is off.

Having thus described my invention, I claim:

1. In combination, an electric controller having a movable handle operatively connected thereto, a movable circuit closing device carried by said handle, and means for positively holding the circuit closing device against a closing movement when the controller is on.

2. In combination, an electric controller having a movable handle operatively connected thereto, a movable circuit closing device and retaining means for preventing the movement of said device to close the circuit when the controller is on, and means rendering inoperative said retaining means which prevents the closing movement of the circuit closer, said means for rendering the retaining means inoperative being so located as to become operative only when the controller is off.

3. In combination, an electric controller, a handle operatively connected therewith, a circuit closer, a yieldable detent for holding said circuit closer in closed position, and means carried by said handle and located adjacent to the hand grip thereon adapted to receive sufficient pressure to overcome the yieldable detent and open the circuit closer.

4. In combination, an electric controller having a handle operatively connected therewith, a circuit closer carried by said handle, means for retaining the circuit closer in closed position, means adjacent to the grip of said handle adapted to release said retaining menas, and means for holding said circuit closer open until the controller is returned to the off position.

5. In combination, an electric controller, a handle therefor, circuit closing means carried by said handle, a hand-engaging part for said circuit closing means located adjacent to the grip of the handle, a catch for holding the circuit closer open except when the controller is in the off position, and a key operated lock adapted to lock the circuit closer in open position.

6. In combination, an electric controller having a movable handle operatively connected thereto, a movable circuit closing device and retaining means for preventing the movement of said device to close the circuit when the controller is on, a stop positioned to render said retaining means inoperative when the controller is in its off position.

7. In combination, an electric controller, a movable handle operatively connected with the same, a circuit closer, means carried by said handle adapted to open said circuit closer, and a key lock adapted to lock said circuit closer in the open position.

In testimony whereof, I hereunto affix my signature in the presence of two witnesses.

DE WITT C. COOKINGHAM

Witnesses:
H. R. SULLIVAN,
E. B. GILCHRIST.